United States Patent [19]

Kurata

[11] Patent Number: 4,479,242
[45] Date of Patent: Oct. 23, 1984

[54] DICHROMATIC READING DEVICE

[75] Inventor: Masami Kurata, Kanagawa, Japan

[73] Assignee: Fuji Xerox Co., Ltd., Kanagawa, Japan

[21] Appl. No.: 354,325

[22] Filed: Mar. 2, 1982

[30] Foreign Application Priority Data

Mar. 6, 1981 [JP] Japan .................................. 56-31334

[51] Int. Cl.³ .......................... G06K 9/20; G06K 7/00
[52] U.S. Cl. ...................................... 382/17; 382/58; 355/4; 358/75
[58] Field of Search ...................... 382/17, 58; 358/75, 358/79, 80; 355/4; 250/226; 356/402, 406, 411, 414, 416, 425

[56] References Cited

U.S. PATENT DOCUMENTS 3,209,070  9/1965  Sakai ....................................... 355/4
4,023,040  5/1977  Weber ................................. 235/469
4,189,224  2/1980  Mawby ................................. 358/79

Primary Examiner—Leo H. Boudreau
Assistant Examiner—Michael D. Parker
Attorney, Agent, or Firm—Sughrue, Mion, Zinn, Macpeak, and Seas

[57] ABSTRACT

A dichromatic reading device is disclosed in which the difference is taken between output signals from a first image sensor receiving reflected light directly and a second image sensor receiving the reflected light after being passed through a filter which blocks a specific color component of the reflected light. The difference is converted into a binary signal which provides one color image information and which together with a binary signal obtained from at least the second image sensor and inverted, is NANDed to provide a second color image information.

9 Claims, 6 Drawing Figures

DICHROMATIC READING DEVICE

BACKGROUND OF THE INVENTION

The present invention relates to a dichromatic reading device for use with a sheet bearing information printed in various colors, which is capable of reading out information printed on the sheet in one color discriminately from that printed in other colors.

Where image information having various colors is printed on a white sheet, and it is desired to record the image from the sheet using a recording device which can record information in two colors, for example, red and black, red image information is reproduced in the red color, for example, and the remaining portions of the information colored other than red are reproduced in the black color.

FIG. 1 is an explanatory illustration of the operational principle of a conventional dichromatic reading device which has the color information function. With such a device, it is assumed that the portion of the information which is printed in red is read out as it is and the remaining portion of the information which is read out as black image information. The device includes a first image sensor which receives light reflected from the information bearing sheet and coverts it into an electrical analog signal, and a second image sensor which receives the reflected light after passing through a cyan filter, which is a complement of red and thus blocks the red color, and converts it into another electrical analog signal.

FIG. 1(a) shows the levels of pulses, each of which corresponds to a portion of the information printed in a different color, obtained from the analog signal from the first image sensor. In FIG. 1(a), the signal level corresponding to a black colored portion of the information is zero, and the signal levels corresponding to blue and green colored portions are substantially the same. The signal level corresponding to the red colored portion of the information is about twice that of the blue or green colored portion, and the signal level corresponding to a white colored portion, i.e., the background portion, is the highest. Therefore, by discriminating the output pulses from the first image sensor with a predetermined threshold level which is higher than the blue and green levels and lower than the red level, a "white" binary signal is obtained as shown in FIG. 1(b).

On the other hand, FIG. 1(c) shows the pulse levels for the portions of the information printed in various colors obtained from the second image sensor. In this case, the pulse level corresponding to the black portion is zero as in the case of the first image sensor and the levels corresponding to blue and green information are substantially the same as those output by the first sensor, since the blue and green light can pass through the cyan filter which cuts off only red light. Therefore, the pulse level corresponding to the red information becomes zero and that corresponding to the white background is lowered since the red component of the white light is also cut off. Therefore, by discriminating the output of the second image sensor with the predetermined threshold level, a "complementary" binary signal is obtained as shown in FIG. 1(d).

FIG. 2 shows an operation circuit which receives the two kinds of binary signals in FIG. 1(b) and 1(d), to obtain a red image signal and a black image signal.

In FIG. 2, the operation circuit is composed of an inverter 16 whose input terminal 12 is used as one of the inputs to the operation circuit, and a NAND gate 14 which has a first input connected to an output of the inverter 16, and a second input connected to a first input terminal 11 of the operation circuit. A first output 15 of the operation circuit is taken from the NAND gate, and the second output is taken from terminal 13 directly connected to the second input 11.

The "white" binary signal in FIG. 1(b) is supplied to the first input terminal 11 and the "complementary" binary signal in FIG. 1(d) is supplied to the second input terminal 12.

During the time when the dichromatic reading device is reading out the black, blue or green image portions of the information, the output of the first image sensor, i.e., a binary 0 is supplied to the first input terminal 11 of the operation circuit, which appears at the second output terminal 13 thereof as it is.

The second output terminal 13 is inversely related to the black image signal, and the reading device is designed to print in black when a binary 0 appears thereat.

The binary 0 is also supplied at one input to the NAND gate 14 during the time when the device is scanning either black, blue or green areas, and the NAND gate 14 thus provides binary 1 at the first output 15 of the operation circuit.

The reading device functions to print red color information upon the appearance of the signal 0 at the second output 15 of the operation circuit.

On the other hand, when the dichromatic reading device is reading out red image information, the binary 0 is supplied to the second input 12 of the operation circuit and a binary 1 signal to the first input 11. The signal 0 supplied to the second input 12 is passed to an inverter 16 by which it is inverted. The inverted signal is supplied to the other input of the NAND gate 14. In this case, a binary 1 is supplied to both of the inputs of the NAND gate 14 and therefore a binary 0 appears at the first output 15 of the operation circuit. At this time, since the signal at the second output terminal 13 of the operation circuit is 1, the reading device functions to print the red information according to the binary 0 at the first output 15.

When the reading device is reading out the white area (background), a binary 1 is supplied to the second input terminal 12 and therefore a binary 0 is supplied to the first input of the NAND gate 14 causing a binary 1 to appear at the second output 15. Since at this time the second output 13 provides a binary 1, there is no print signal obtained from the operation circuit.

In the conventional dichromatic document reading device as mentioned above, the condition indispensable to correct operation is the equality in level of the pulses corresponding to the blue or green image information from the first and second image sensor. That is, if the above condition is not satisfied, the dichromatic reading device cannot provide a correct result. For example, if the first image sensor is more sensitive than the second sensor to green, for example, and green image information is represented by a binary 1 of the "white" binary signal and by a binary 0 of the "complementary" binary signal due to some improper selection of the threshold level, the operation circuit in FIG. 2 will interpret the above situation as being the red printing condition.

Thus, in the conventional device, it is impossible to read a specific color discriminately from other colors unless the threshold levels of the two image sensors are selected suitably and individually according to the characteristics of the image sensors and the signal processing circuit. This is difficult and troublesome as a practical matter.

SUMMARY OF THE INVENTION

In view of the above mentioned defect of the prior art, an object of the present invention is to provide a dichromatic reading device capable of reliably separating a specific color from other colors without the troublesomeness of particularly setting the threshold levels for the respective image sensors.

According to the present invention, an electric circuit is provided in the dichromatic reading device which functions to obtain the difference between the level of an image signal readout without a filter, and the level of a signal readout through a complementary filter for the specific color, and to produce an image signal for the specific color from the difference.

BRIEF DESCRIPTION OF THE DRAWINGS

The present invention will be described in detail with reference to the embodiments shown in the accompanying drawings, in which.

DETAILED DESCRIPTION OF THE PREFERRED EMBODIMENTS

Figure 3:
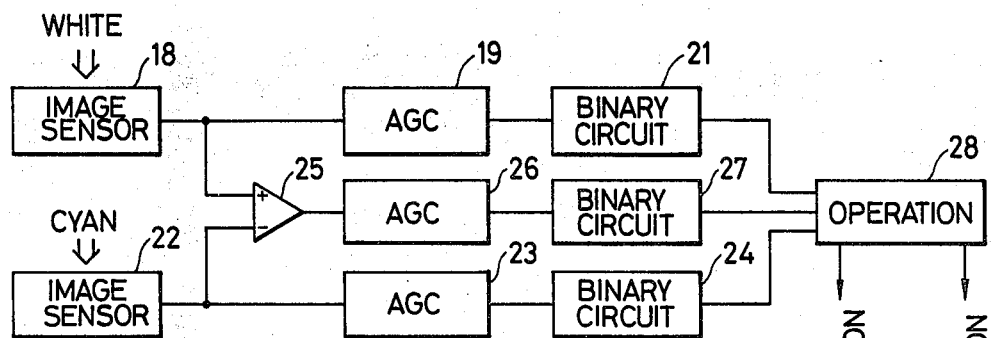
FIG. 3 is a block diagram of one embodiment of the present invention.

In FIG. 3, which shows the main portion of a dichromatic reading device according to the present invention, and which is capable of reading out specific color information discriminately from other color information, the output of a first image sensor 18, which may be of the conventional type, is connected to a first automatic gain control (AGC) circuit 19 and to one input of a differential amplifier 25. A second image sensor 22, which may be of the conventional type, is connected to a second AGC 23 and to the other input of the differential amplifier 25. The output of the amplifier 25 is connected to a third AGC 26. The AGC's 19, 23 and 26 are connected to binary circuits 21, 24, and 27, respectively, and the outputs of the binary circuits 21, 24 and 27 are connected to an operation circuit 28.

Figure 4:
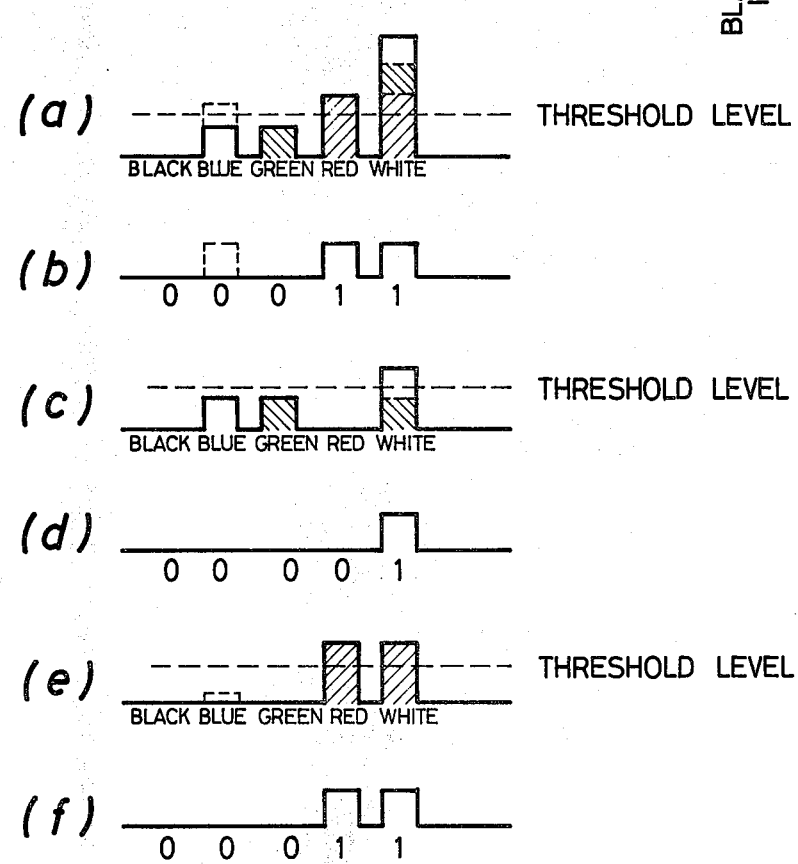
FIG. 4 illustrates signal waveforms to be processed by the circuit of FIG. 3.

The first image sensor 18 is adapted to receive light reflected from a document which is irradiated with white light, and convert it into an electric signal as in the conventional device. Pulse levels of the image signal provided by the first image sensor 18 due to black, blue, green, red and white components of the reflected light are as illustrated in FIG. 4(a).

The analog pulses from the first image sensor 18, each of which correspond to a different color, are supplied to the first AGC 19 in which the pulse levels are regulated. The analog pulses regulated by the AGC 19 are supplied to the first binary circuit 21 in which the pulses are discriminated with a predetermined threshold level and converted into binary signals as shown in FIG. 4(b).

The second image sensor 22 is adapted to receive the reflected light after being passed through a cyan filter, which is complementary to red and blocks the latter, and to convert it into electric signals corresponding to the various color components. Pulse levels of the image signals are shown in FIG. 4(c). The pulses having the levels shown are supplied to the second AGC 23, and after being regulated are discriminated with the predetermined threshold level in the second binary circuit 23, to obtain the binary signal shown in FIG. 4(d).

According to the present invention, the differential amplifier 25 is provided, as mentioned, to enhance the red pulse level in relation to the blue and green pulse levels. The differential amplifier 25 is supplied with variable level pulses which are obtained by the image sensors 18 and 22 and provides an image signal corresponding to the difference between the outputs of the image sensors 18 and 22 for each color component. The levels of the output analog pulse from the differential amplifier 25 for each color component are shown in FIG. 4(e). It will be noted that the green and blue components are substantially zeroed.

The level of each output analog pulse of the differential amplifier 25 is passed through the third AGC 26 and discriminated with a predetermined threshold level in the third binary circuit 27 as shown in FIG. 4(e), resulting in binary signals as shown in FIG. 4(f). With this circuit construction, the binary signal in FIG. 4(f) can be obtained even if the first image sensor 18 is more sensitive than the second sensor 22 to, e.g., blue light as shown by a dotted line in FIG. 4(a), since the difference in the blue level is very small, as shown by the dotted line in FIG. 4(e). The operation circuit 28 utilizes the binary signals produced by the first, second and third binary circuits 21, 24 and 27 to obtain black and red image signals.

Figure 5:
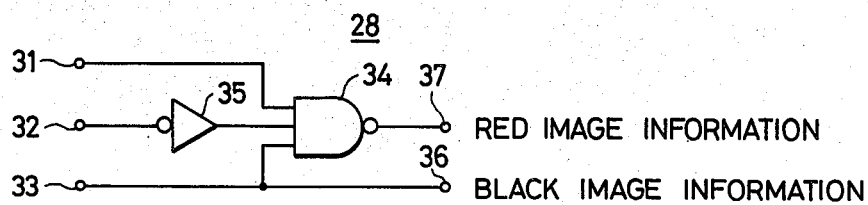
FIG. 5 is a circuit diagram of an operation circuit suitable for use in the embodiment in FIG. 3.

FIG. 5 shows the operation circuit 28 in detail. The operation circuit 28 has first, second and third input terminals 31, 32 and 33 to which the outputs of the first, second and third binary circuits 21, 24 and 27 are supplied, respectively. The binary signal supplied to the first input terminal 31 is connected to one of three inputs of a NAND gate 34, the binary signal supplied to the second input terminal 32 is connected to a second input of the NAND gate 34 after being inverted by an inverter 35, and the binary signal supplied to the third input terminal 33 is connected to the third input of the gate 34 and to a first output terminal 36 of the operation circuit 28, which provides a print signal for black image information when a binary signal 0 appears thereat. A second output terminal 37 of the operation circuit 28 is the output of the NAND gate 34, which provides a print signal for red image information when a binary 0 appears thereat.

With the operation circuit 28 constructed as above, when the dichromatic reading device is reading image information other than red image information, there is a binary 0 at the third input terminal 33 of the operation circuit 28 and thus a black print signal 0 is provided at the first output terminal 36 of the circuit 28. On the other hand, only when the device is reading the red image information does the NAND gate 34 provide a binary 0. Therefore, a red image print signal is provided at the second output terminal 37. When the device is scanning the background area of the document, a binary 1 appears at both of the output terminals 36 and 37, resulting in no print signal.

According to this invention, the difference between the output of an image sensor which receives reflected light directly, and the output of the image sensor which receives the reflected light after being passed through the complementary filter is obtained for each color component to enlarge the ratio of the level of the signal corresponding to color information to be discriminated relative to that of signals corresponding to other color information, and a binary signal is obtained for the color to be discriminated by discriminating these signals with a predetermined threshold level. Therefore, it becomes possible to precisely separate one specific color from other colors.

Figure 2:
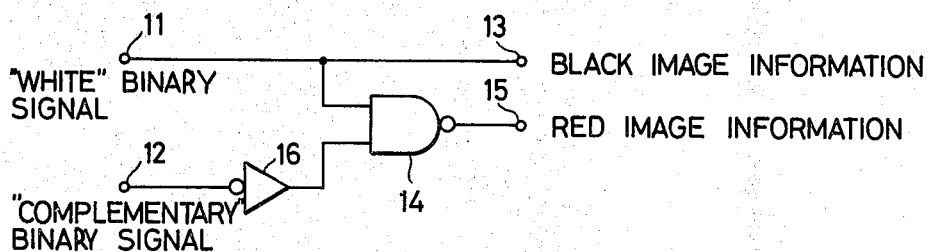
FIG. 2 is a circuit diagram of an operation circuit for use in connection with the signals of FIG. 1.
Figure 6:
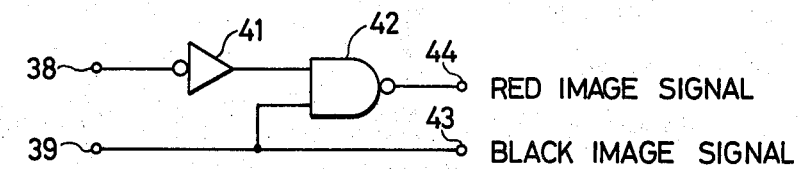
FIG. 6 is a circuit diagram of an operation circuit suitable for use in the embodiment of FIG. 3.

Although in the preceding embodiment image signals of two colors are produced by using three binary signals, it is possible to obtain the same image signals by using the electrically produced binary signal for the specific color, and either one of two binary signals used in producing the binary signal for the specific color. The operation circuit for processing these signals, in this case, may of the type shown in FIG. 2 and illustrated for this use in FIG. 6.

Figure 1:
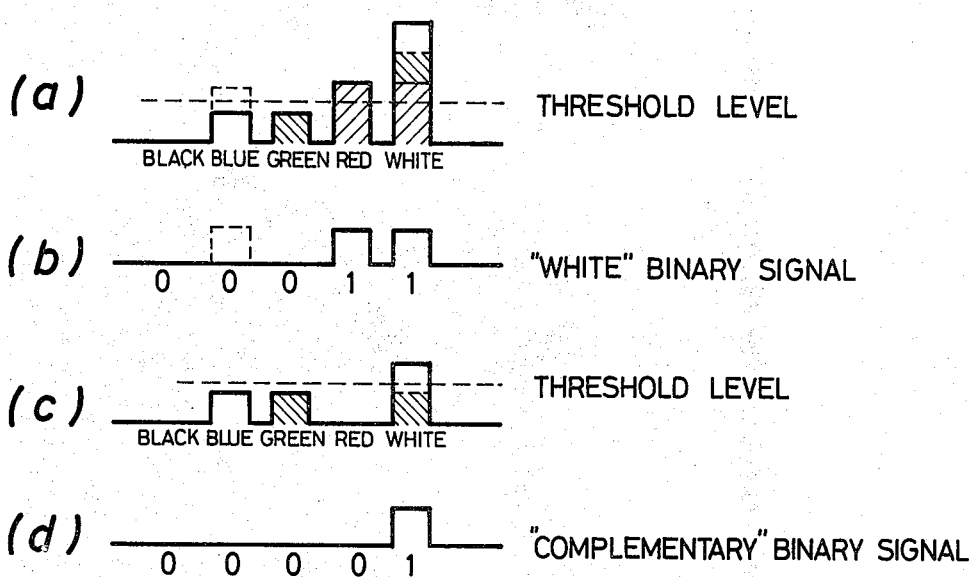
FIG. 1 illustrates various waveforms obtained by a pair of image sensors, and processed by associated processing circuits of a conventional dichromatic reading device.

In such a case, the "complementary" binary signal from the binary circuit 24 is supplied to the terminal 12 in FIG. 1 and the binary signal from the binary circuit 27 is applied to the terminal 11.

What is claimed is:

1. A dichromatic reading device for use with variously colored information bearing sheets, comprising: a first image sensor responsive to light reflected directly from a sheet to produce a first analog pulse train containing plural pulses, each corresponding to a different color component of the reflected light, filter means capable of blocking a first color component of the reflected light, a second image sensor responsive to the reflected light after having passed through said filter means, to produce a second analog pulse train containing plural pulses, each corresponding to a different color component of the reflected light, first threshold means for converting the first analog pulse train into a first binary pulse train, second thresold means for converting the second analog pulse train into a second binary pulse train, first means for producing a third analog pulse train from the first and second analog pulse trains, third threshold means for converting said third analog pulse train into a third binary pulse train, and second means responsive to at least said second binary pulse train and said third binary pulse train to produce a first color printing signal when the device is scanning the information printed on the sheet in said first color, and a second printing signal when the device is scanning information printed on the sheet in colors other than the first color.

2. A dichromatic reading device as claimed in claim 1, said first means comprising a differential amplifier, and wherein said third analog pulse train is the difference between said first and second analog pulse trains.

3. A dichromatic reading device, comprising a first sensor responsive to light reflected from an information sheet, a second sensor responsive to said light after being filtered to remove one color therefrom, a difference amplifier for producing a difference signal indicative of the difference between outputs of said first and second sensors, thereby increasing the relative value of a signal indicative of said one color, with respect to that of other colors, and means responsive to said difference signal and at least said second sensor output for producing color printing signals in dependence upon the color of the information on said sheet.

4. The dichromatic reading device of claim 1, said second means comprising inverter means receiving said second binary pulse train, an output of said inverter forming one input of a NAND gate.

5. The dichromatic reading device of claim 4, said NAND gate receiving as a second input said third binary pulse train.

6. The dichromatic reading device of claim 5, an output of said NAND gate comprising said first color printing signal.

7. The dichromatic reading device of claim 1, said second means comprising inverter means receiving said second binary pulse train and a NAND gate, an output of said inverter and said third binary pulse train forming first and second inputs of said NAND gate.

8. The dichromatic reading device of claim 7, said first binary pulse train forming a third input of said NAND gate, an output of said NAND gate comprising said first color printing signal.

9. The dichromatic reading device of claim 8, said third binary pulse train forming a second output of said second means.

* * * * *